May 26, 1959        K. GEBELE        2,887,937

INTERCHANGEABLE LENS FOR PHOTOGRAPHIC APPARATUS

Filed July 15, 1955

United States Patent Office 2,887,937
Patented May 26, 1959

2,887,937
INTERCHANGEABLE LENS FOR PHOTOGRAPHIC APPARATUS

Kurt Gebele, Munich, Germany, assignor to Hans Deckel, Munich-Solln, Germany, and Friedrich Wilhelm Deckel, Zug, Switzerland Application July 15, 1955, Serial No. 522,332

Claims priority, application Germany July 16, 1954

2 Claims. (Cl. 95—45)

This invention relates to an interchangeable lens, particularly for photographic apparatus, especially a lens in which one part is movable relative to another part for focusing, and which is provided with an adjustable diaphragm or stop.

An object of the invention is the provision of a generally improved and more satisfactory structure of this kind.

Another object is the provision of a focusing lens which can be easily and quickly attached to a photographic shutter or other appropriate part of a camera, in such manner that the diaphragm aperture adjustment of the interchangeable lens is coupled to the shutter speed adjustment of the camera, so that movement of one causes a compensating movement of the other.

Still another object is the provision, in an interchangeable lens, of diaphragm aperture adjusting means mounted on a fixed part of the lens structure and operatively connected to an adjustable diaphragm which is mounted on another part of the lens structure which is axially movable for purposes of focusing.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
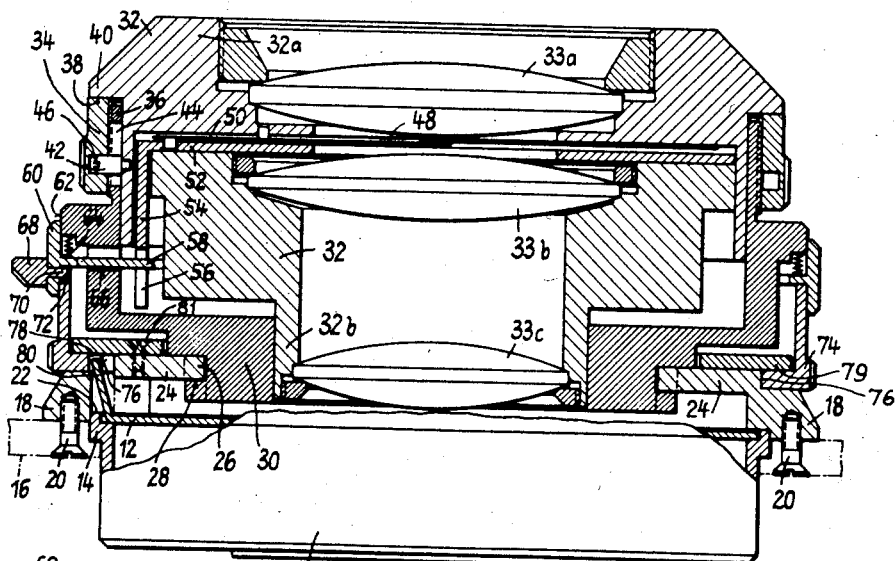
Fig. 1 is a fragmentary cross section through a portion of a photographic shutter and associated lens in accordance with a preferred form of the present invention.

Referring first to Fig. 1, there is shown at 10 the housing a suitable photographic shutter of customary cylindrical shape. The details of the shutter are not important for purposes of the present invention and any suitable shutter of the objective type may be employed. Arranged within the housing or casing 10 are the usual shutter blades movable to open and close the lens aperture in known manner. In order to set the shutter for different speeds of exposure, there is provided a shutter speed setting ring 12 rotatably supported on the front of the shutter housing 10. For instance, this shutter speed setting ring may correspond in general to the shutter speed setting ring 63 in the Deckel and Geiger U.S. Patent 1,687,123, granted October 9, 1928. The shutter housing is provided on its periphery with a flange 14 which has a rearwardly faced shoulder abutting against a corresponding shoulder on the front wall 16 of the camera on which the shutter is mounted.

A bayonet ring member 18 surrounds the shutter and is secured to the camera wall 16 by means of a few screws 20 spaced at intervals around the periphery of the ring. A portion 22 on the bayonet ring 18 overlies the front edge of the shutter housing and prevents forward axial movement of the shutter, while rotary movement of the shutter is prevented by a suitable radial screw or pin (not shown) extending from the shutter housing into either the camera wall 16 or the bayonet ring 18.

The bayonet ring has a portion 24 in the form of a flange which carries bayonet projections 26 adapted to mate in the usual detachable manner with the bayonet lugs 28 on the part 30 of the lens mount. As usual, the lens mount part 30 may be slightly rotated relative to the stationary bayonet mounting ring parts 18, 24, 26, rotation in one direction serving to release the lens mount so that it may be removed axially forwardly from the camera, and rotation in the opposite direction serving to clamp the lens mount firmly upon the bayonet mounting of the camera. When the lens mount is clamped in position on the camera, the portion 30 represents the fixed or axially immovable part of the interchangeable lens structure.

The mount portion 30 serves as a support for another lens mount portion 32 which is of somewhat tubular form and which is movable forwardly and backwardly in an axial direction, for purposes of focusing the camera upon objects at different distances. The portion 32 thus represents the axially movable part of the interchangeable lens structure, as distinguished from the axially fixed part 30. The part 32 includes a front portion 32a and a rear portion 32b, and carries any desired number of lens components indicated diagrammatically at 33a, 33b, and 33c, arranged in known manner and held in their seats by the usual mounting rings screwed into internal threads.

The axial movement of the mount portion 32, for focusing purposes, is effected by means of a threaded ring 34 which engages screw threads on a threaded connection piece 36 on the mount 30. The forward end 38 of the focusing ring 34 presses forwardly against a projection or ledge 40 of the lens tube 32. A pin or screw 42 mounted on the movable lens tube 32 extends radially outwardly through an axial slot 44 in the threaded connection part 36 of the stationary mount 30 and into an internal circumferential groove or slot 46 of the threaded ring 34, so that rotation of the focusing ring 34 causes only an axial movement of the part 32 without causing any rotary movement thereof.

An adjustable iris diaphragm or stop, of known type and method of operation, includes a number of diaphragm leaves or blades indicated diagrammatically at 48 and arranged in a cavity 50 of the lens tube or mount 32, which cavity extends in a direction transverse to the optical axis. The setting or adjusting ring 52 of the iris diaphragm has, at one point on its periphery, a rearwardly extending arm 54 provided with an axial slot 56 somewhat longer than the maximum extent of axial travel of the lens tube 32 relative to the lens mount portion 30. This slot 56 embraces closely but slidably a radial driving tongue 58 formed on an actuating member 60 which constitutes a coupling ring axially displaceable and also circumferentially rotatable on the cylindrical periphery portion 62 of the mount 30.

Figure 2:
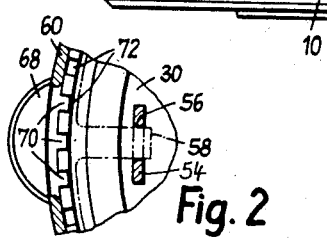
Fig. 2 is a fragmentary section showing a detail of the construction illustrated in Fig. 1.

A few light springs 64, arranged at intervals in a circumferential direction around the ring 60, tend to press the ring rearwardly on its supporting and guiding surface 62. The radial opening 66 in the mount 30, through which the tongue 58 extends, is wide enough in an axial direction to allow the necessary freedom of axial movement of the ring 60. A knob 68 (see also Fig. 2) is fastened to the coupling ring 60, as for example by being riveted thereto, and has inwardly protruding coupling lugs or claws 70 adapted to engage selectively in the coupling notches 72 formed on the front edge of a shutter speed setting tube or ring 74 rotatably mounted on a cylindrical projection 76 of the bayonet ring 18. As best seen in Fig. 1, the rear face of the shutter speed setting ring 74 bears rotatably on a forwardly faced shoulder on the bayonet ring 18, and the ring 74 has a radially inwardly extending flange, the front or forward face of which is engaged and held in place by an overlying retaining plate 79 held on the portion 24 of the bayonet ring 18 by screws 81.

The shutter speed setting ring 12 of the shutter 10 has, at one point on its periphery, a forwardly bent tongue or ear 80 which engages in a slot 78 of the speed setting ring or tube 74 which is mounted on the camera, thus coupling the speed setting ring 12 of the shutter itself to the speed setting ring 74 of the camera, so that both of them turn together. Thus the speed setting rings 12 and 74 are coupled to each other at all times, whether the interchangeable lens is in place on the camera or not. Also, on the interchangeable lens itself, the internal diaphragm adjusting member 52 is coupled at all times to the external diaphragm adjusting member 60 regardless of the axial position of the focus adjusting parts. And whenever the interchangeable lens is mounted in place on the camera, the diaphragm adjusting ring 60 is coupled to the shutter speed adjusting ring 74 by means of the teeth 70 of the former engaging in the teeth or notches 72 of the latter. This provides a particularly efficient and simple construction for coupling the shutter speed adjustment to the diaphragm adjustment of an interchangeable lens of the focusing type, in which the diaphragm is incorporated in the lens structure.

Figure 3:
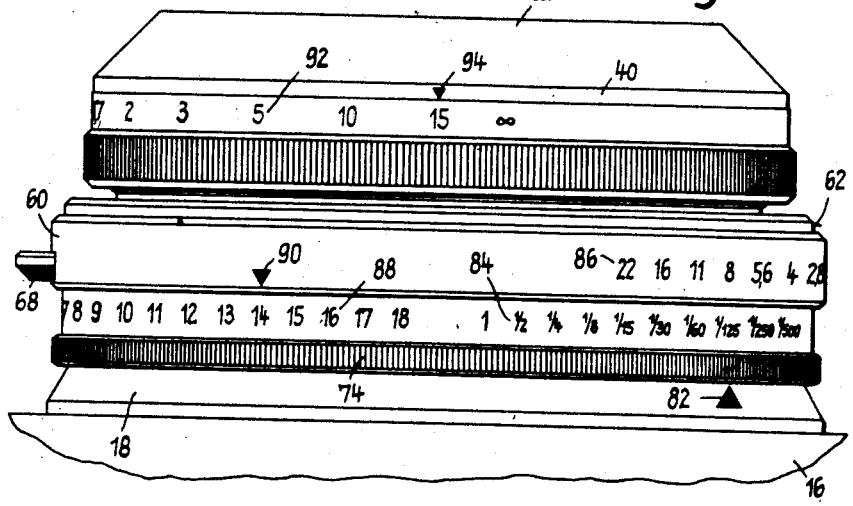
Fig. 3 is a plan of the interchangeable lens and associated shutter, illustrating the scales.

The arrangement of the graduated scales on the various parts is best shown in Fig. 3. The bayonet mounting ring 18 carries a main reference mark or pointer 82 which serves as the reference point both for the shutter speed scale 84 marked on the speed setting ring 74, and for the diaphragm aperture scale 86 marked on the periphery of the coupling ring or external diaphragm aperture setting ring 60. The relative setting or position of orientation of the ring 60 relative to the ring 74 is effected by means of a scale 88 marked on the ring 74, read in conjunction with a pointer or reference mark 90 marked on the ring 60. This scale 88 is graduated in a manner to indicate the relative positions of the shutter speed setting member and diaphragm aperture setting member relative to each other, regardless of the absolute positions of either of them. This scale may be referred to as a total exposure value scale or integrated exposure value scale, often called merely a light value scale for short. The range or distance scale for focusing purposes is shown at 92, and is marked on the focus adjusting ring 34 for cooperation with an index mark or reference point 94 on the part 40 of the lens mount.

In use, the operator attaches the interchangeable lens to the camera by the usual motion, first in an axial direction toward the camera, and then a rotary motion to carry the bayonet mounting lugs of the lens under the bayonet mounting lugs of the camera in tight engagement therewith. The attachment of the lens structure to the camera parts will result in coupling the ring 60 to the ring 74, but not necessarily in the exact relationship or orientation desired. The operator then presses axially forwardly on the knob 68, against the force of the spring 64, to disengage the teeth 70 from the notches 72, so that the ring 60 can be turned without turning the ring 74, in order to adjust these parts to the desired position of orientation relative to each other, depending on light conditions, film speed, filter factor, or other pertinent conditions, as determined by use of a light meter or by estimation. For instance, if it is determined that the light conditions, film speed, etc., are such as to require a light value setting or integrated exposure value setting of "14," the ring 60 is turned while pressed forwardly (uncoupled from the ring 74) until the index mark 90 on the ring 60 lies opposite the numeral 14 of the graduated scale 88, as seen in Fig. 3. The ring 60 is then allowed to move axially rearwardly again, under the influence of the springs 64, thus coupling the two rings together.

The ring 74 may now be turned to bring any selected shutter speed of the scale 84 opposite the stationary index mark 82. Such turning of the ring 74 will automatically turn, at the same time, the ring 60 to adjust the diaphragm aperture in a complementary manner. In Fig. 3, the parts are shown set for a shutter speed of 1/125 of a second, which corresponds to a diaphragm aperture of f:8, when the parts are set for a light value or total exposure value of 14 as shown. At the same time, the same total exposure value corresponds also to various other possible combinations of shutter speed and diaphragm aperture, for example, a shutter speed of 1/60 and an aperture of f:11, or a shutter speed of 1/30 and a diaphragm aperture of f:16, or a shutter speed of 1/500 and a diaphragm aperture of f:4. It will be noted also that rotation of the focusing ring 34, to focus the lens for different distances, does not affect either the shutter speed setting or the diaphragm aperture setting, and does not interfere in any way with the automatic coupling between shutter speed and diaphragm aperture. The fact that the diaphragm leaves or blades move axially during the focusing operation, does not cause any complications or interfere with the successful operation of the coupling mechanism.

It is seen from the foregoing disclosure that the above mentioned objects of the invention are well fulfilled. It is to be understood that the foregoing disclosure is given, by way of illustrative example only, rather than by way of limitation, and that without departing from the invention, the details may be varied within the scope of the appended claims.

What is claimed is:

1. A photographic camera and interchangeable lens structure comprising, in combination, a camera body part having an objective shutter housing mounted thereon, a shutter speed adjusting ring mounted for rotation with respect to said housing and held against axial movement with respect thereto, said speed adjusting ring including a radially extending flange rotatably seated on a fixed bearing surface and a circular cylindrical flange extending forwardly from said radial flange and an externally accessible circumferentially extending grasping portion for manually turning said speed adjusting ring, said cylindrical flange having a series of circumferentially spaced notches at its forward edge, a first lens mount part interchangeably mounted on said camera body part and lying partly within said cylindrical flange and extending forwardly beyond the forward edge of said cylindrical flange, said first lens mount part being immovable axially with respect to said camera body part so long as it remains mounted in operative position thereon and being axially movable with respect to said camera body part during the act of detachment from and attachment to said camera body part, a second lens mount part mounted on said first lens mount part for axial movement with respect thereto for focusing, said second lens mount part lying partly within said first lens mount part and extending forwardly beyond the forward edge of said first lens mount part, an adjustable diaphragm carried by and movable axially bodily with said second lens mount part, a first diaphragm aperture adjusting ring rotatably mounted on said second lens mount part in axially fixed position with respect to said second lens mount part so as to move axially with said second lens mount part when the latter moves axially for focusing, said first aperture adjusting ring having at one side thereof an operating arm extending rearwardly toward said shutter housing and having an axially extending slot therein, said slot being of greater axial length than the maximum axial travel of said second lens mount part with respect to said first lens mount part, a second diaphragm aperture adjusting ring mounted on said first lens mount part for rotation and also for limited axial movement with respect to said first lens mount part, a spring tending to move said second aperture adjusting ring rearwardly to the rearward limit of its axial movement, an arm on said second aperture adjusting ring engaging in said axially extending slot in said arm of said first aperture adjusting ring to maintain a rotary driving connection between said second aperture adjusting ring and said first aperture adjusting ring in all axially focused positions of the latter, the rear portion of said second aperture adjusting ring being of larger diameter than the forward edge of said cylindrical flange of said speed adjusting ring and normally encompassing said forward edge in telescopic relation thereto, and a tooth on said second aperture adjusting ring for engaging in a selected one of said notches in said cylindrical flange of said speed adjusting ring to couple said speed adjusting ring and both of said aperture adjusting rings to each other for conjoint rotation.

2. A photographic camera and interchangeable lens structure comprising, in combination, a camera body part having an objective shutter housing mounted thereon, a shutter speed adjusting ring mounted for rotation with respect to said housing, a first lens mount part interchangeably mounted on said camera body part, said first lens mount part being immovable axially with respect to said camera body part so long as it remains mounted in operative position thereon and being axially movable with respect to said camera body part during the act of detachment from and attachment to said camera body part, a second lens mount part mounted on said first lens mount part for axial movement with respect thereto for focusing, an adjustable diaphragm carried by and movable axially bodily with said second lens mount part, a first diaphragm aperture adjusting ring rotatably mounted on said second lens mount part in axially fixed position with respect to said second lens mount part so as to move axially with said second lens mount part when the latter moves axially for focusing, a second diaphragm aperture adjusting ring mounted on said first lens mount part for rotation with respect thereto, an axially telescopic driving connection for driving said first aperture adjusting ring rotationally from rotary movements of said second aperture adjusting ring in all axially focused positions of said second lens mount part, and means releasable by an axial separating movement for rotationally coupling said second aperture adjusting ring to said shutter speed adjusting ring for conjoint rotation therewith.

References Cited in the file of this patent

UNITED STATES PATENTS

| | | |
|---|---|---|
| 883,607 | Andrews | Mar. 31, 1908 |
| 1,678,119 | Klein | July 24, 1928 |
| 1,687,123 | Deckel et al. | Oct. 9, 1928 |
| 1,689,268 | Wittel | Oct. 30, 1928 |
| 2,087,020 | Colaiace | July 13, 1937 |
| 2,190,729 | Nerwin | Feb. 20, 1940 |
| 2,480,973 | Schwarz | Sept. 6, 1949 |
| 2,527,781 | Willcox | Oct. 31, 1950 |
| 2,527,800 | Dorsey | Oct. 31, 1950 |
| 2,596,328 | Dorsey | May 13, 1952 |
| 2,649,024 | Goldhamer | Aug. 18, 1953 |
| 2,716,930 | Marson | Sept. 6, 1955 |

FOREIGN PATENTS

| | | |
|---|---|---|
| 666,365 | Germany | Oct. 18, 1938 |
| 523,785 | Belgium | Nov. 14, 1953 |
| 1,001,432 | France | Oct. 27, 1954 |